June 30, 1970  
L. M. MARTIN  
3,517,845  
LATERAL LOADING APPARATUS FOR STORAGE  
AND RETRIEVAL OF STACKED GOODS  
Filed Nov. 1, 1968  
5 Sheets-Sheet 1
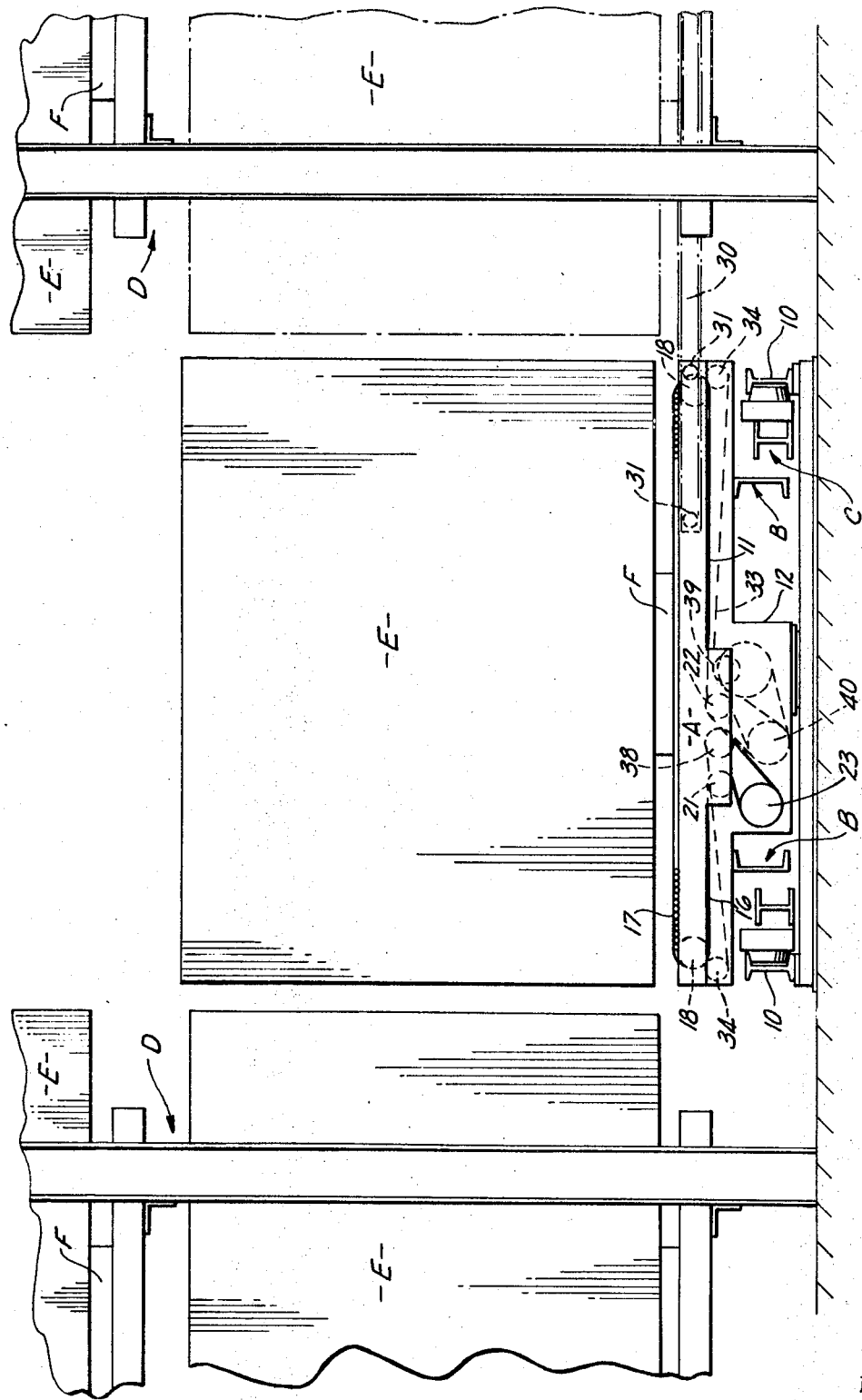
INVENTOR.  
LEONARD M. MARTIN  
BY BOSWORTH, SESSIONS

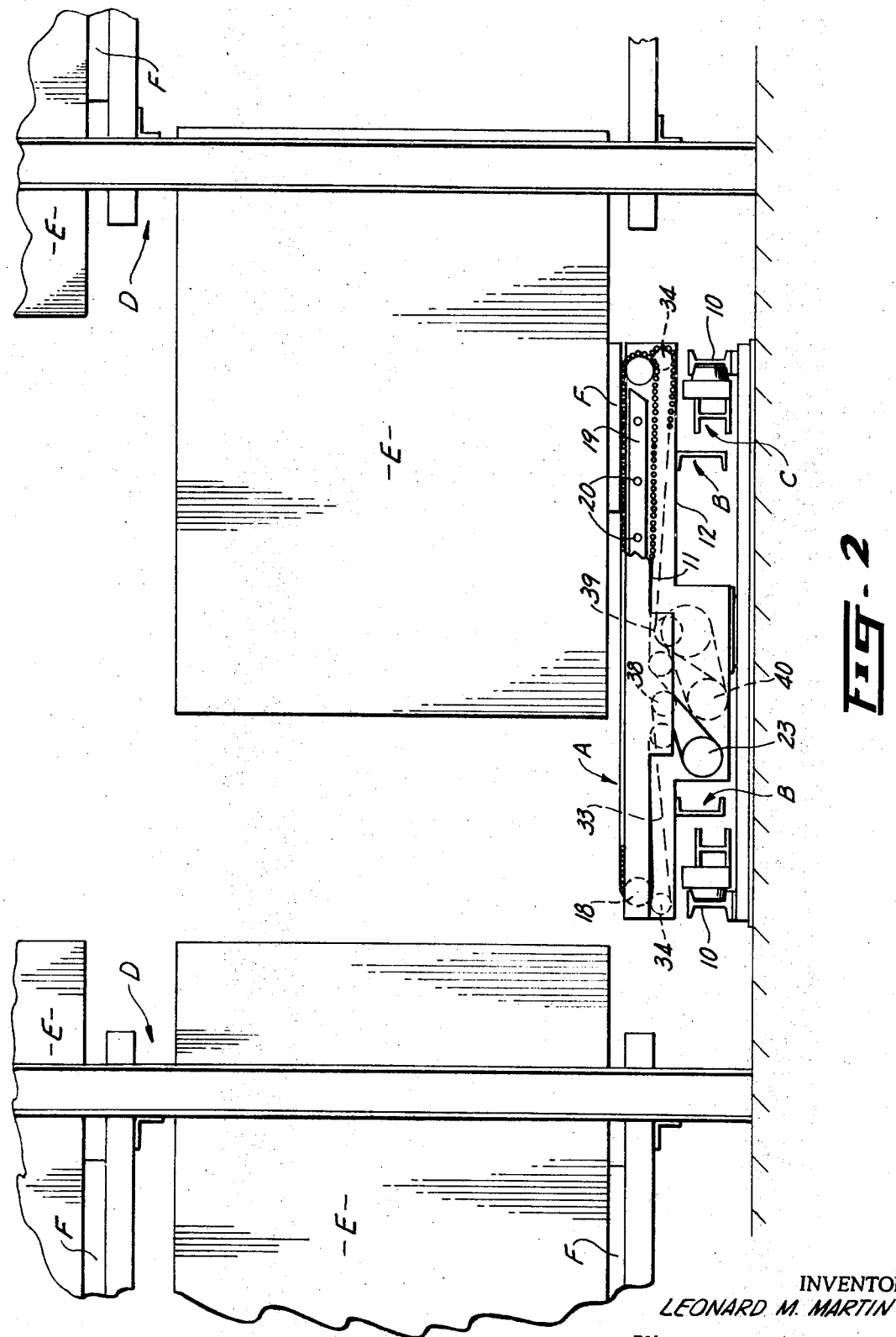

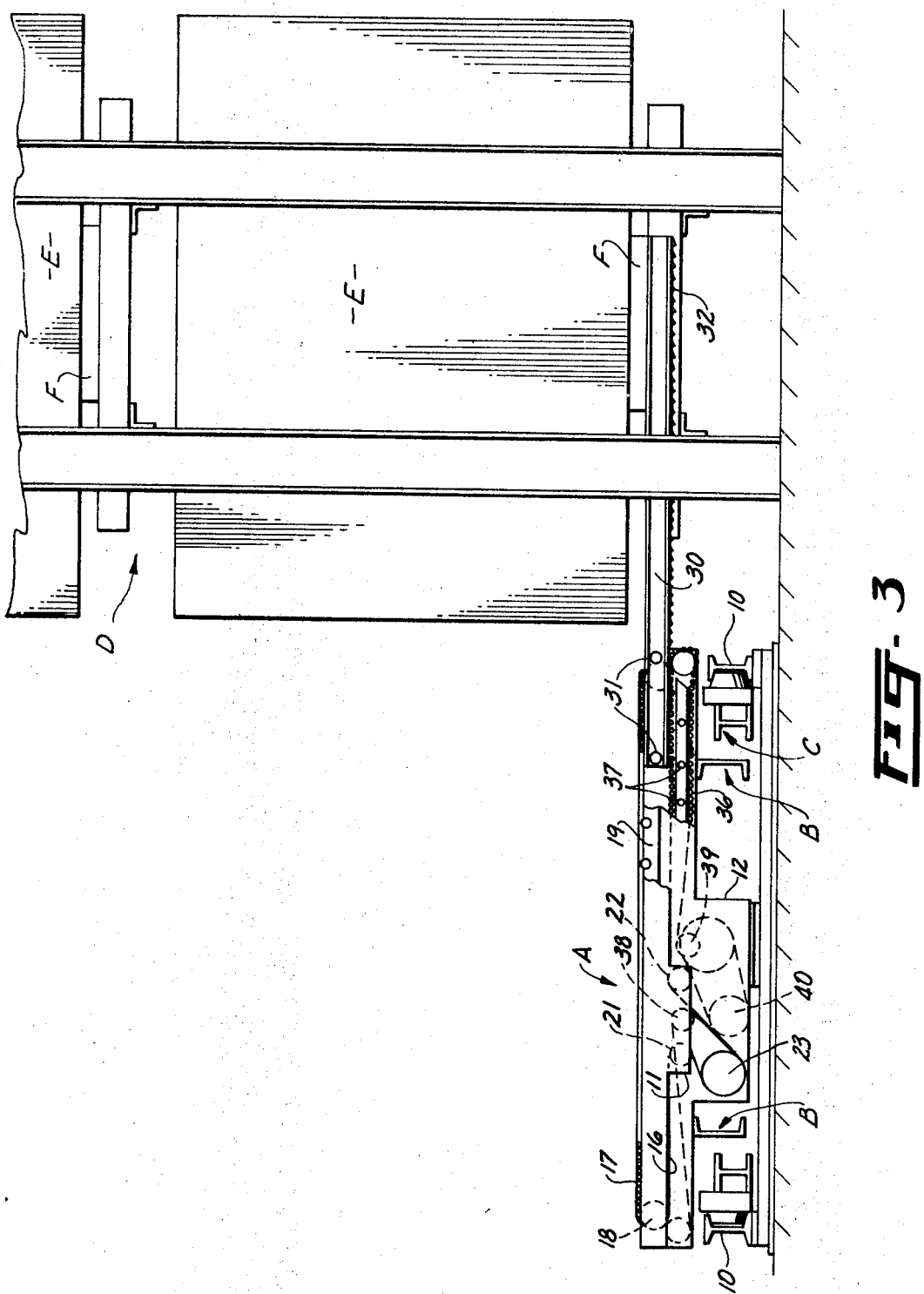

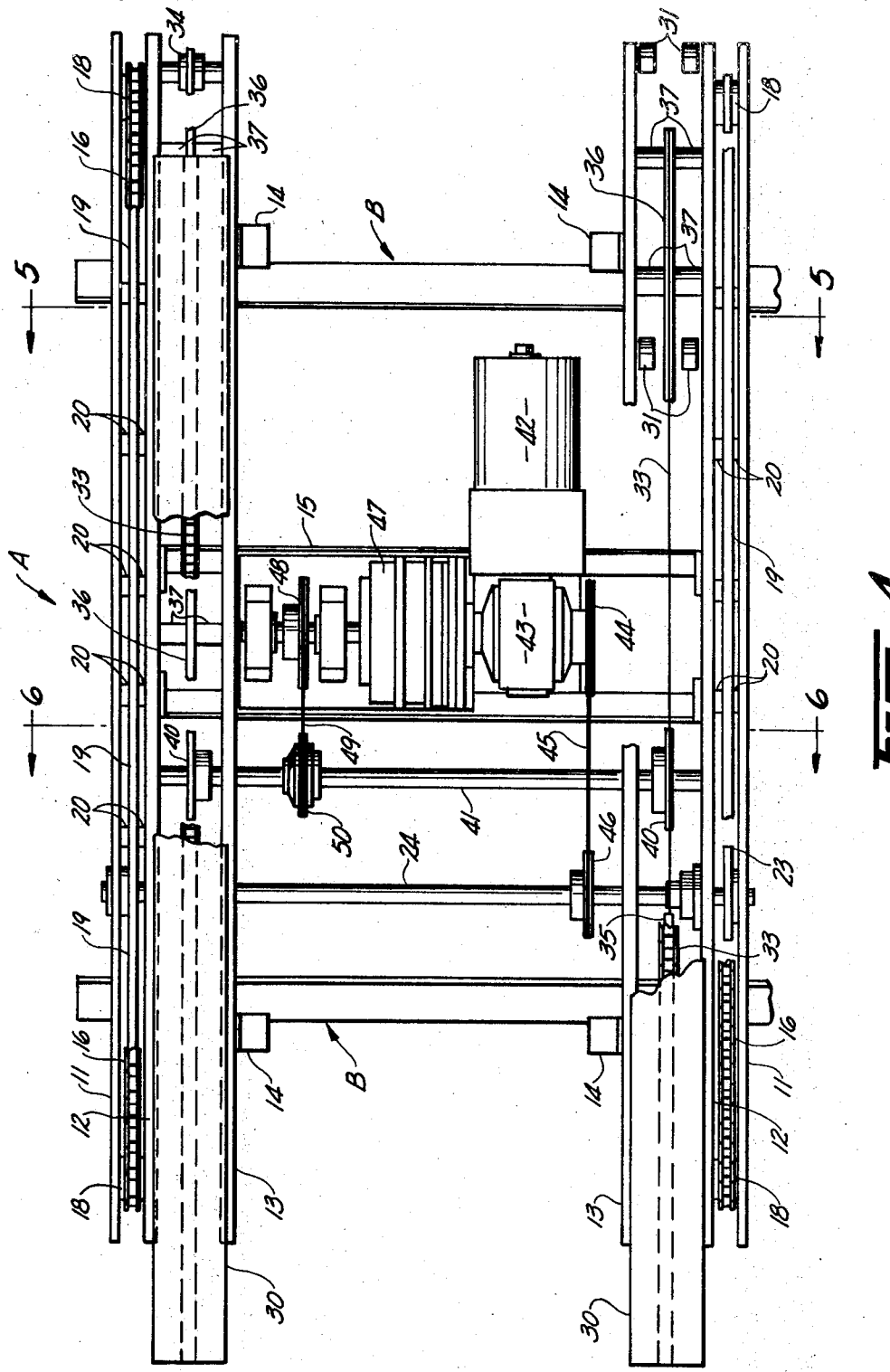

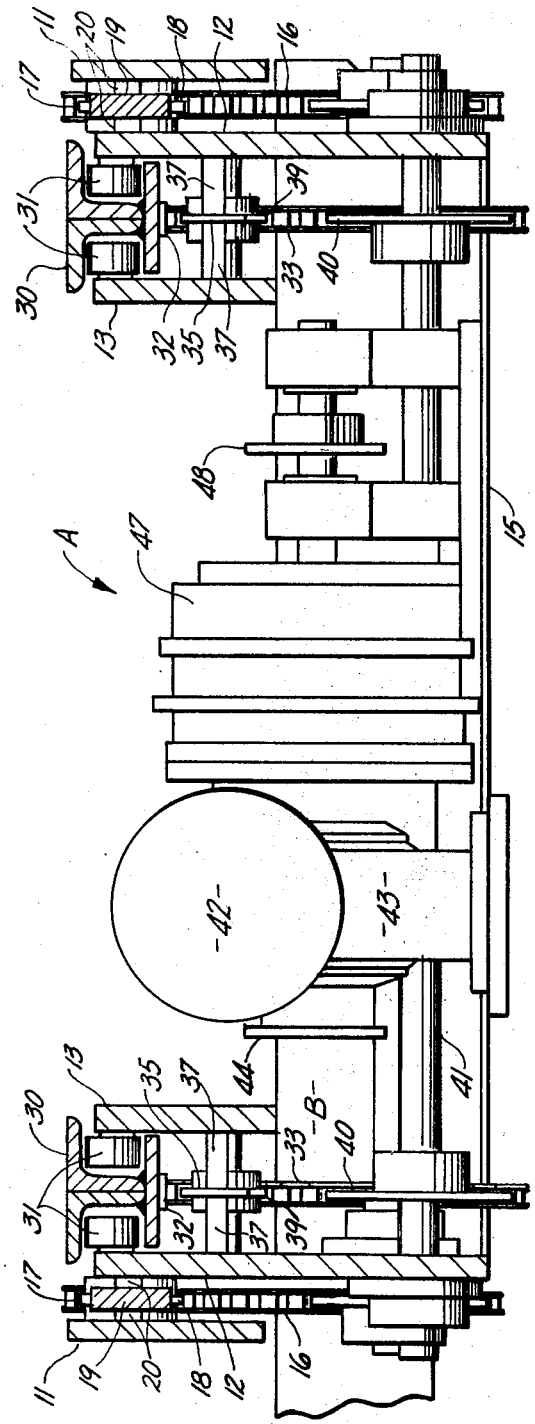
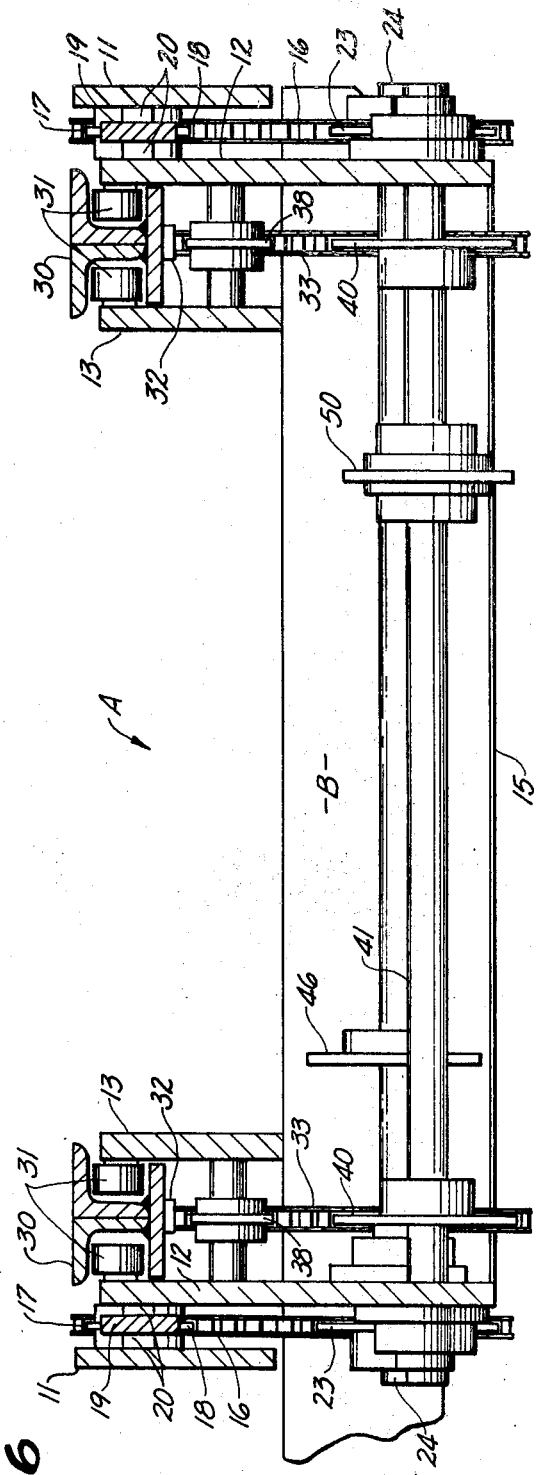

United States Patent Office 3,517,845
Patented June 30, 1970

3,517,845
LATERAL LOADING APPARATUS FOR STORAGE AND RETRIEVAL OF STACKED GOODS
Leonard M. Martin, Somerville, Mass., assignor to The Colson Corporation, Chicago, Ill.
Filed Nov. 1, 1968, Ser. No. 772,725
Int. Cl. B65g 65/02
U.S. Cl. 214—730     8 Claims

ABSTRACT OF THE DISCLOSURE

A lateral loading apparatus for transferring goods between a transporting position on a carriage in an aisle and a lateral storage position on either side of the carriage in rows of vertical stacks. The apparatus utilizes a pair of roller chains with spaced parallel upper runs defining a conveyer bed, and a pair of spaced parallel booms which travel endwise on the carriage in the same directions as the runs between a centered position and an extended cantilevered position. The booms are at approximately the same level as the conveyer bed and the parallel runs are adapted to carry the goods laterally to the ends of the centered booms. When the goods reach a position over the ends of the booms the booms begin moving simultaneously with the parallel runs to carry the goods beyond the conveyer bed and laterally to a storage position in the adjacent row of vertical stacks.

BACKGROUND OF THE INVENTION

This invention relates to the storage and retrieval of containers or goods on or from rows of vertical stacks on opposite sides of an access aisle. Normally the containers or goods are placed on pallets which are supported by arms in vertical racks such as in a warehouse.

Many standardized type storage facilities utilize automated storage and retrieval systems and the goods are placed in standard containers such as rectangular boxes or skeletal frames which may be for example 67" x 67" on the sides and 50" high. Such containers may be carried for example on standard pallets 24" x 45" on the sides and 2½" high. These pallets are positioned on support arms in the racks with their longitudinal dimension parallel to the adjacent aisle. In this particular system the aisles are only 73" wide and thus afford a clearance of only 3" on each side for a container being moved along the aisle.

The container and pallets to be stored or retrieved must be moved both laterally of the particular row to or from a transporting position in the aisle to a storage position in the racks, and must also be moved longitudinally along the aisle to or from the end thereof for further disposition.

In order to make the most economical use of storage space in a warehouse or the like while at the same time facilitating the storage and retrieval, it is desirable to locate the goods in rows of vertical stacks on opposite sides of access aisles with the width of the aisles being slightly wider than the containers or goods to be stored. Also since the containers or goods are commonly placed on pallets, the spaces provided for the goods on the vertically aligned storage racks must be adapted to receive and support the pallets.

Accordingly, a fork lift truck, stacker crane, or other material handling vehicle for transporting the containers or goods during storage and retrieval must be capable of traveling up and down the aisles while carrying the container and pallet on a suitable carriage, of lifting and lowering the container and pallet between the highest and lowest vertically aligned storage spaces in the stacks, and also of shifting the container and pallets laterally between a position on the carriage in the aisle and a position in the selected storage space. Due to the narrow width of the aisles it is preferable that the vehicle run along the aisles on rails. This reduces the danger of the vehicle or container striking the stored goods in the rows which might otherwise occur due to the narrow clearance between the containers or goods on the vehicle carriage and the rows of vertical stacks.

Fork-lift type vehicles or stacker cranes are most often used for this purpose, however, since they have no room to turn 90° for lateral transfer of the containers and pallets from the aisles to the racks, they must have a lateral shifting capability. Furthermore the lateral shifting capability should contemplate movement in both directions or in other words to the racks on either side of the vehicle.

In order to move the container and pallet from the vehicle to the rack, it will be apparent that the vertical center line of the container must be moved from approximately the vertical center line of the aisle to approximately the vertical center line of the stack or in other words slightly further than the width of the container itself. If lateral booms alone are used to shift the goods by extending the booms sidewise in cantilever fashion from the vehicle supporting them, then the boom must necessarily be at least as long as the width of the container and in fact somewhat longer so that the pallet will be in a stable balanced position thereon and also in order to provide sufficient boom length for effective cantilever leverage.

Unfortunately the use of booms alone is not satisfactory in narrow aisles since as indicated above the aisles are generally only slightly wider than the containers. Telescoping booms are one solution to the problem however they are operable only in one lateral direction and thus would greatly limit the operating capability of the vehicle.

The apparatus of the present invention however meets the long felt need described above and affords other features and advantages not obtainable in the prior art.

SUMMARY OF THE INVENTION

It is among the objects of the invention to transfer containers or articles to be stored between a position on a vehicle in a narrow aisle between rows of stacked storage spaces, and a position in a storage space in the rows of vertical stacks.

Another object of the invention is to enable a fork lift truck, stacker crane, or other such material handling vehicle to transfer containers or goods supported thereon, such as on pallets, laterally to or from a storage location in racks located on either side of the vehicle.

A further object is to enable such a fork lift truck, stacker crane, or the like to operate in narrow aisles while still having the capability of shifting goods laterally to either side of the aisle to and from storage racks vertically stacked along rows on either side of the narrow aisles.

These and other objects are accomplished by a bidirectional side shifting mechanism carried on a fork lift truck, stacker crane, or other carriage and comprising a frame mounted for vertical travel on the carriage and pair of continuous roller chains carried on the frame and having spaced parallel runs defining a horizontal conveyor bed. The runs are driven selectively in directions perpendicular to the travel of the carriage along aisles between rows of vertical storage racks. Cooperating with the roller chain runs are a pair of spaced parallel booms which are extendible laterally from the frame in opposite directions and which have their upper surfaces spaced just slightly below the conveyor bed defined by the roller chain runs. The booms are extendible through linear endwise travel simultaneously with the roller chains between a centered position on the frame and either of two laterally extended cantilevered positions. The booms are driven at the same linear speed as the roller chain runs and are adapted to begin movement after the roller chain runs have translated a pallet or container from a centered position on the conveyer bed to either side of the conveyer bed such that the outer side of the pallet is directly above the ends of the booms. From this position the booms begin their extension simultaneously and at the same linear velocity as the roller chain runs so that the pallet is transferred from the conveyer bed to the booms and thereafter carried by the booms laterally across the aisles to a storage position in the vertical racks.

According to one aspect of the invention, the booms have a roller chain rack on the bottom thereof and are driven by a second pair of roller chains. In the preferred form both pairs of roller chains are driven by the same motor, the drive for the conveyer bed roller chains being connected directly from the motor and the drive for the roller chains for the boom being through a clutch which is engaged selectively so that the boom movement may be initiated simultaneously with the registration of the pallet with the ends of the booms.

BRIEF DESCRIPTION OF THE DRAWINGS

FIG. 1 is an elevational view of a lateral shifting apparatus for storage and retrieval of stacked goods according to the invention, the apparatus being carried on the forks of a stacker crane which moves along an aisle between rows of vertical stacks and being shown with a pallet and container carried thereon in a centered position in solid lines, for movement along the aisle and in a storage position in the vertical stacks in dashed lines;

FIG. 2 is an elevational view similar to FIG. 1 but showing the pallet and container moved laterally across the conveyer bed to one side thereof and with parts broken away and shown in section;

FIG. 3 is another elevational view similar to FIG. 1 and showing the booms of the apparatus extended laterally to their limits of extension to position the pallet with the container thereon on a rack in the vertical stacks and with parts broken away and shown in section;

FIG. 4 is a plan view of the apparatus of FIG. 1 with parts broken away for the purpose of illustration;

FIG. 5 is a sectional view taken on the line 5—5 of FIG. 4; and

FIG. 6 is another sectional view taken on the line 6—6 of FIG. 4.

DESCRIPTION OF THE PREFERRED EMBODIMENT

Referring more particularly to the drawings there is shown a lateral shifting apparatus embodying the invention and carried on the forks B of a stacker crane C. The stacker crane C runs along aisles located between opposite rows of vertical racks D which receive containers E mounted on pallets F. The stacker crane C carries the pallets F and containers E along the aisle on the shifting apparatus A and also is adapted to lift the apparatus A on the forks B to a position adjacent the lowest as well as the highest storage spaces in the vertical racks D.

The apparatus A is adapted to transfer the pallets F and containers E between a centered position on the forks B in the aisle and a lateral storage position on the racks D. The crane C runs on rails 10 extending along the aisles so that the width of the aisles need be only slightly greater than the width of the containers themselves in order to make optimum utilization of storage space.

The loading apparatus A has a rigid frame secured to the forks B, the frame including six vertical plates mounted laterally along each side and including on each side, an outer side plate 11, a middle side plate 12, and an inner side plate 13. Each middle side plate 12 is somewhat larger than the adjacent side plates 11 and 13, and is welded to the forks B using suitable brackets 14. The middle side plates 12 are connected to one another by a cross beam 15 which serves as a base for the drive equipment to be described below.

Located between each outer side plate 11 and its corresponding middle side plate 12 is a roller chain 16. The chains 16 have horizontal upper runs 17 extending parallel to one another perpendicular to the forks B and defining a conveyor bed for a pallet F. The chains 16 may be driven in either direction to move a pallet F from a centered position on the conveyor bed (FIG. 1) to a position at the side of the conveyor bed (FIG. 2). The lateral runs 17 extend between end pulleys 18 which are journaled between their respective outer side plate 11 and middle side plate 12, and are supported from below by supporting bars 19 which are centered between the respective outer side plates 11 and middle side plates 12 by spacers 20.

Below the upper runs 17, the roller chains 16 pass over idler pulleys 21 and 22 and thence around a drive pulley 23 carried on a shaft 24 journaled at its ends in the middle side plates 12 and extending laterally from one side of the apparatus to the other.

Located between the inner side plate 13 and middle side plate 12 on each side of the apparatus A respectively is one of a pair of spaced parallel booms 30 in the form of welded "I" beams which are of approximately the same length as the width of the containers. The booms are extendible between a position centered on the apparatus (FIG. 1) and an extended cantilever position which may be to either side of the aisle, one such position being shown in dashed lines in FIG. 1 and in solid lines in FIG. 3. The booms 30 travel on rollers 31 located in pairs at five uniformly spaced locations, the rollers 31 being journaled in the respective side plates 12 and 13.

Welded to the bottom of the booms 30 are roller chain racks 32 driven by a second pair of roller chains 33. The chains 33 are positioned between the respective middle side plate 12 and inner side plate 13 immediately below their respective booms 30, the upper runs thereof being in engagement with the respective roller chain racks 32.

The roller chains 33 extend between end pulleys 34 and the upper runs are supported from below by support bars 35 and 36, the bars being positioned one at each opposite end of the loading apparatus and centered between the respective middle side plate 12 and inner side plate 13 by spacers 37. Below the upper runs, the roller chains 33 pass around idler pulleys 38 and 39 from where they extend to drive pulleys 40 mounted on a shaft 41 extending between opposite sides of the apparatus and journaled at its ends in the middle side plates 12.

Both the upper roller chains 16 and the roller chains 33 which drive the booms 30 are driven by a drive motor 42 through a gear reducer 43. The gear reducer has a direct drive output sprocket 44 on one side which engages a drive chain 45 connected to a take-up sprocket 46 mounted on the shaft 24. The opposite end of the output shaft of the gear reducer 43 is connected to an electric clutch brake 47 which has an output sprocket 48. A drive chain 45 which engages the output sprocket 48 turns a takeup sprocket 50 mounted on the shaft 41 (FIG. 4).

Thus the roller chains 16 are driven whenever the motor 42 is operating, however the roller chains 33 which drive the booms 30 are operated only when the clutch brake 47 is engaged.

OPERATION

Since the operation of the apparatus A during the storage of a container E and pallet F is just the reverse of the retrieval of a container and pallet from the racks, the operation will be described only with respect to the storage sequence. The sequence of operation during retrieval will thereafter be readily apparent.

The operation begins after the forks B of the stacker crane C have been used to pick up a container E and its pallet F from a distribution point. The pallet F is picked up on the conveyor bed of the apparatus A so as to be centered thereon as shown in FIG. 1. The stacker crane C then moves down an aisle to a position adjacent a vertical rack on which the container E and pallet F are to be stored. It will be noted that the vertical racks may be on either side of the aisle.

The forks B are then raised or lowered to position the loading apparatus A at the desired vertical position relative to the space wherein the container E and pallet F are to be stored. In this position the bottom of the pallet will be approximately 1½" above the beams of the rack on which the pallet is to be supported and sufficient clearance will be provided for the booms to move into and out of the space without interference with the beams which extend perpendicular to the aisles. With the container B in the aisle (FIG. 1) it will be seen that there is a very narrow clearance between it and the containers in the storage racks.

The operator of the stacker crane C initiates the lateral movement by actuating the drive motor 42 which runs the upper roller chains 16 and moves the pallet F with the container E laterally to approximately the position shown in FIG. 2. In this position the longitudinal side of the pallet F registers with the ends of the booms 30 at which time a limit switch (not shown) closes and the electrical clutch brake 47 is engaged to start the lateral extension of the booms 30.

The roller chains 33 which drive the booms 30 are driven at the same speed as the roller chains 16 so that the booms extend with the same speed and in the same direction as the upper runs 17 of the roller chain 16. The conveyor bed defined by the upper runs 17 is very slightly higher, say ⅛", from the top of the booms 30 and as the conveyor bed moves the pallet F further to the right as viewed in FIGS. 2 and 3 the pallet eventually comes to rest on the booms alone. The booms then extend to the position shown in FIG. 3 wherein the container has been moved a distance slightly greater than its full width into the storage racks with the pallet supported above the beams of the rack on which it will eventually rest. When the booms reach their full extension a limit switch closes to cause the clutch brake 47 to disengage and stops the drive motor 42.

At this point the stacker crane C lowers the forks B so that the pallet comes to rest on the rack support beams. The forks continue to lower somewhat so as to provide clearance for removing the booms 30 from beneath the pallet F after which the booms are returned to a centered position by reversing the drive motor 42. When the booms 30 are centered a limit switch again signals the drive motor 42 which stops and the stacker crane may then be moved along the aisle as desired.

Although only one embodiment of the invention is illustrated and described, it will be understood that variations and modifications may be made in the form and arrangement of the several parts and elements thereof without departing from the spirit of the invention. The invention therefore is not to be limited to the particular structure and mechanism herein shown and described nor in any manner inconsistent with the extent to which the progress in the part has been advanced by the invention.

What is claimed is:

1. In an apparatus for transporting goods during storage and retrieval thereof including a carriage and means on the carriage for elevating the goods, the improvement which comprises an endless conveyer mounted for linear movement on said elevating means in fixed relation thereto and defining a horizontal bed adapted to shift goods supported thereon perpendicular to the travel of said carriage, spaced parallel booms defining a horizontal supporting surface substantially at the level of said conveyer bed and adapted for linear endwise travel in the same direction as said conveyer bed, between a centered position on said elevating means and an extended cantilevered position laterally of said carriage, and means for driving said conveyer and for selectively driving said booms at the same linear speed as said conveyer whereby goods centered on said conveyer bed may be shifted thereby to one side thereof whereupon said booms are extended simultaneously and said goods are progressively transferred from said conveyer bed to said booms and are carried by said booms to a storage position adjacent said carriage and vice versa.

2. Apparatus as defined in claim 1 wherein said conveyer comprises a pair of endless roller chains having spaced parallel horizontal runs.

3. Apparatus as defined in claim 1 comprising two spaced parallel booms defining said supporting surface, said booms being in the form of "I" beams, and pairs of coaxial rollers supporting said booms for linear horizontal travel, said rollers of each pair being mounted on opposite sides of the web of the respective boom and between the flanges thereof.

4. Apparatus as defined in claim 3 wherein said booms have a rack secured to the bottom thereof and including a pair of endless roller chains with spaced parallel horizontal upper runs, each of said runs being positioned beneath each boom and in operative engagement with its respective rack whereby said booms are propelled by said roller chains.

5. In an apparatus for transporting goods during storage and retrieval thereof including a carriage and means on the carriage for elevating the goods, the improvement which comprises a pair of endless chains carried for movement on said elevating means and having spaced parallel runs defining a horizontal conveyer bed, said runs being movable perpendicular to the travel of said carriage, a pair of spaced parallel booms defining a horizontal supporting surface substantially at the level of said conveyer bed and supported on said elevating means for linear endwise travel in the same direction as said runs between a centered position on said frame and one of two extended cantilevered positions, said positions being on opposite sides of said frame, and means for driving said chains and for selectively driving said booms at the same linear speed as said chains whereby goods centered on said conveyer bed may be shifted by said chains to one side of said conveyer bed whereupon said booms are extended simultaneously and said goods are progressively transferred from said conveyer bed to said booms and carried by said booms to a storage position adjacent said carriage and vice versa.

6. Apparatus as defined in claim 5 wherein said means for driving said chains and booms includes a rack secured to the bottom of each boom and a second pair of endless chains carried for movement on said elevating means and having spaced parallel horizontal upper runs, one of said runs being positioned beneath each boom and in operative engagement with its respective rack whereby said booms are propelled by said second pair of chains.

7. Apparatus as defined in claim 6 comprising a first pair of coaxial drive sprockets for driving said pair of chains defining said conveyer bed and a second pair of coaxial drive sprockets for driving said second pair of chains.

8. Apparatus as defined in claim 7 comprising a rotary drive motor and an electric clutch, said first pair of sprockets being operatively connected to said drive motor for driving movement whenever said motor is operating and said second pair of sprockets being operatively connected to said motor through said clutch for driving movement whenever said clutch is engaged and said motor is operating.

References Cited

UNITED STATES PATENTS

| 2,892,554 | 6/1959 | Decker. | |
| 3,175,722 | 3/1965 | Paulssen | 214—731 |

ROBERT G. SHERIDAN, Primary Examiner

U.S. Cl. X.R.

214—16.4